US010826771B2

(12) United States Patent
Garrett, Jr. et al.

(10) Patent No.: US 10,826,771 B2
(45) Date of Patent: Nov. 3, 2020

(54) STATE IDENTITY VECTOR FOR SYSTEM SELF AWARENESS

(71) Applicant: Cisco Technology, Inc., San Jose, CA (US)

(72) Inventors: John W. Garrett, Jr., Apex, NC (US); Brett Dunstan, Newtown (AU); Jeffrey Owen Apcar, Willoughby (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 60 days.

(21) Appl. No.: 16/145,584

(22) Filed: Sep. 28, 2018

(65) Prior Publication Data

US 2020/0106673 A1    Apr. 2, 2020

(51) Int. Cl.
*H04L 12/24* (2006.01)
*H04L 29/06* (2006.01)

(52) U.S. Cl.
CPC ...... *H04L 41/0893* (2013.01); *H04L 41/0672* (2013.01); *H04L 41/0813* (2013.01); *H04L 41/0853* (2013.01); *H04L 41/0873* (2013.01); H04L 63/20 (2013.01)

(58) Field of Classification Search
CPC ............. H04L 41/0893; H04L 41/0672; H04L 41/0813; H04L 41/0853; H04L 41/0873; H04L 63/20
See application file for complete search history.

(56) References Cited

U.S. PATENT DOCUMENTS

| | | | | |
|---|---|---|---|---|
| 9,154,377 | B1* | 10/2015 | Sokolov | H04L 41/0813 |
| 2011/0243553 | A1* | 10/2011 | Russell | G06Q 30/0631 |
| | | | | 398/25 |
| 2016/0088017 | A1* | 3/2016 | Green | H04L 63/20 |
| | | | | 726/1 |
| 2018/0270229 | A1* | 9/2018 | Zhang | H04W 12/06 |
| 2019/0306731 | A1* | 10/2019 | Raghuramu | H04W 48/16 |

OTHER PUBLICATIONS

Sven van der Meer, et al., "The Applicability of Self-Awareness for Network Management Operations", Conference paper, Oct. 2009, DOI: 10.1007/978-3-642-05006-0_2, https://www.researchgate.net/publication/221326612, 12 pages.

* cited by examiner

*Primary Examiner* — Arvin Eskandarnia
(74) *Attorney, Agent, or Firm* — Edell, Shapiro & Finnan, LLC

(57) ABSTRACT

Techniques for system self-assessment using a state identity vector are described. In one embodiment, a method includes obtaining a policy that includes a combination of a plurality of features and a set of desired values for the features. The method also includes comparing the policy to a device fingerprint for a network device and determining compliance with the policy based on the comparison between the device fingerprint and the combination of features. The device fingerprint comprises a multi-bit word having a plurality of positions, with each position representing a feature associated with the network device. Upon determining that the network device is not in compliance with one or more features included in the combination of features of the policy, the method includes implementing a responsive action by the network device according to a schema that defines instructions for each feature represented by the plurality of positions in the device fingerprint.

20 Claims, 10 Drawing Sheets

STATE IDENTITY VECTOR FOR SYSTEM SELF AWARENESS

TECHNICAL FIELD

The present disclosure relates to system self-assessment for network policy compliance.

BACKGROUND

Compliance management refers to processes implemented in information technology (IT) organizations to determine whether computing devices of an enterprise network conform to policies defined by the enterprise. Varying approaches have been used in an attempt to apply compliance management to internetworking devices such as routers, switches and other network infrastructure. In some approaches, network configuration and change management (NCCM) application programs are configured to listen for a notification of a configuration change, or to poll a device periodically to determine whether a configuration change has occurred. If a change is detected, then the NCCM application fetches a copy of the current running configuration from the device, stores an archival copy, applies enterprise policies, and determines whether the running configuration complies with the policies or other standards. If violations are found, then an administrator can be alerted. However, this approach is reactive in nature and requires coordination with a monitoring or policy entity.

DESCRIPTION OF EXAMPLE EMBODIMENTS

Overview

Presented herein are techniques for system self-assessment using a state identity vector. In one embodiment, a computer implemented method is provided that includes obtaining, at a network device, a first policy that includes a first combination of a plurality of features and a set of desired values for the first combination of the plurality of features. The method also includes comparing the first policy to a device fingerprint for the network device. The device fingerprint comprises a multi-bit word having a plurality of positions. Each position represents a feature associated with the network device. The method further includes determining whether the network device is in compliance with the first policy based on the comparison between the device fingerprint and the first combination of the plurality of features. Upon determining that the network device is not in compliance with one or more features included in the first combination of the plurality of features of the first policy, the method includes implementing a responsive action by the network device according to a schema that defines instructions for each feature represented by the plurality of positions in the device fingerprint.

Example Embodiments

Conventional network system components lack a dynamic mechanism to generate information that reflects the current state of the system components to allow for self-assessment and self-repair or correction with respect to a desired state, for example, according to one or more network policies.

The principles of the example embodiments described herein provide techniques for system self-assessment using a state identity vector. These techniques provide a mechanism to allow for system components, such as a network device, to perform a variety of beneficial tasks, including, but not limited to: self-assess its current state against a desired intent policy, self-assess a desired configuration, self-assess an operational state, perform a self-comparison to one or more peer devices in a network for consistent operating roles, maintain a history of previous states to allow reversion to a past state or to report compliance, and/or to recall past states for self-analysis or to share with other devices or systems.

Figure 1:
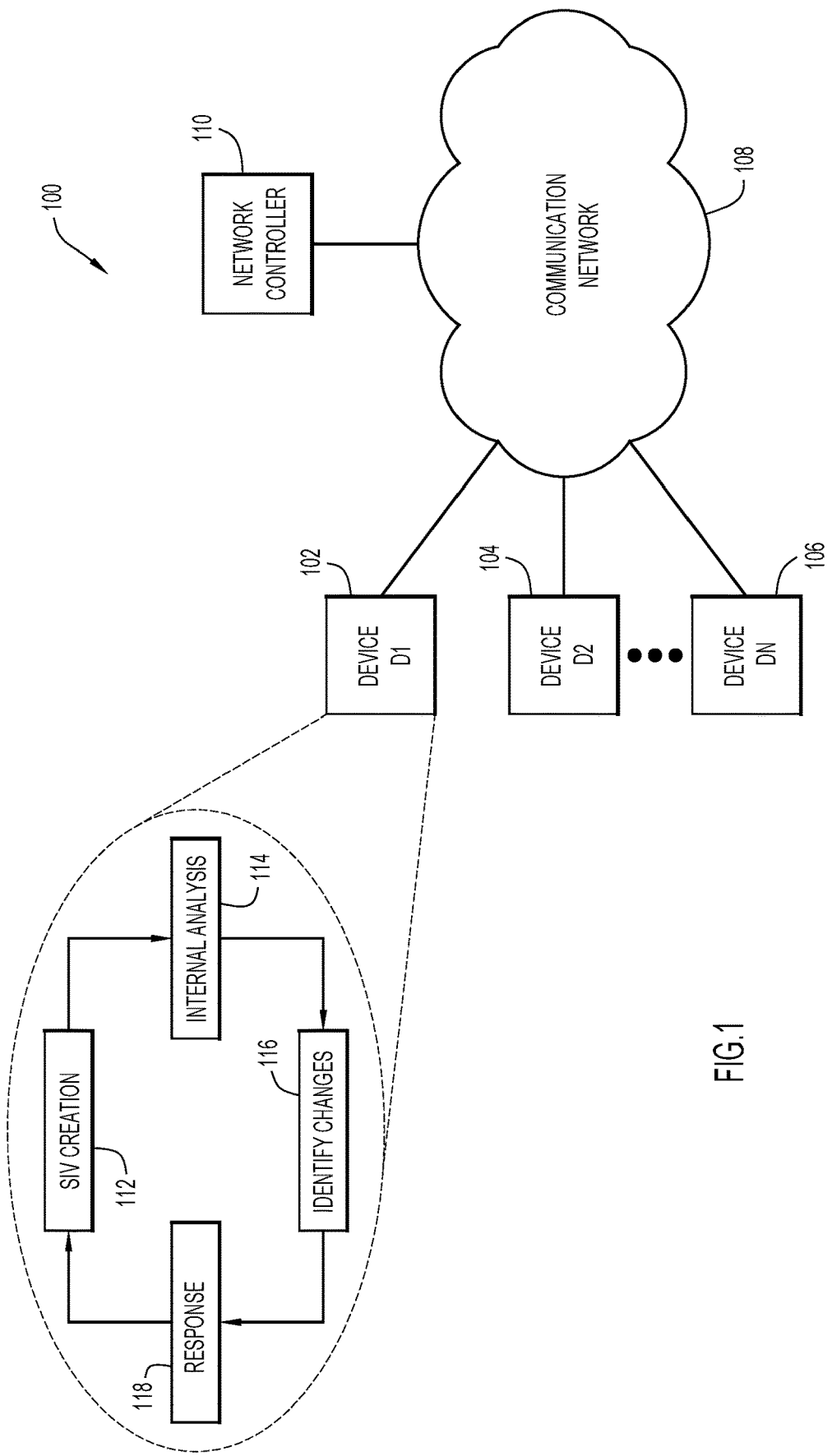
FIG. 1 is a diagram of network in which techniques for system self-assessment using a state identity vector may be implemented, according to an example embodiment.

With reference to FIG. 1, an example of network 100 in which techniques for system self-assessment using a state identity vector may be implemented is shown. Network 100 includes a plurality of network devices, including a first network device (D1) 102, a second network device (D2) 104, and additional network devices, up to an nth network device (DN) 106 (collectively, the plurality of network devices may also be referred to as devices D1-DN). The plurality of network devices 102, 104, 106 are connected to, and configured to communicate with each other over, a communication network 108. Communication network 108 may include local area networks (LANs) and wide area networks (WANs), such as the Internet. Devices D1-DN, which may number in the millions, include any type of computer device configured to communicate with a wired or wireless network, including client devices, server devices, and other network devices (e.g., switches and routers). Client devices D1-DN may include smartphones, computer laptops, and so on.

Additionally, in some embodiments, network 100 may also include a network controller 110. Network controller 110 may include various operation, administrative, and monitoring resources to control and/or manage network 100 and plurality of network devices 102, 104, 106.

At a high-level, the techniques for system self-assessment using a state identity vector described herein allow a network device, for example, first network device 102, to create dynamic state identity vectors that can be used for self-analysis or repair for various configuration, software, policy, and/or security changes. In general, these techniques include state identity vector (SIV) creation 112, internal analysis 114, identification of needed changes 116, and a response 118.

SIV creation 112 includes dynamically identifying relevant device feature information to generate a state identity vector (SIV), also referred to as a device fingerprint. As will be described in more detail below, the SIV or device fingerprint identifies a plurality of features associated with the device. The features and associated instructions for each feature are defined by a schema. The schema defines the location of each feature in the device fingerprint/SIV, the meaning of each feature at those locations, and, in some embodiments, may further include a desired state or instructions for how to reach that state. A device may use the SIV or device fingerprint to perform internal analysis 114. In some embodiment, internal analysis 114 may include comparing the plurality of features associated with the device (i.e., as identified by the SIV or device fingerprint) to a combination of features and associated values of one or more policies. For example, a policy may be associated with a mask, that when used in combination with the schema, allows a device to determine the positions in the device fingerprint/SIV that are important for a given policy associated with the mask. The corresponding features that are associated with those positions is determined from the schema. Based on the comparison, the device may identify changes 116, that is, determine that one or more features of the SIV or device fingerprint are not in compliance with the policy.

Finally, after the device performs the step to identify changes 116, the device may then initiate a response 118. Response 118 may include one or more responsive actions included in the schema for a device to take in order for a given feature to be in compliance with the requirements of a policy. The changes to a device's features implemented by response 118 may then become part of the device's new SIV or fingerprint, reflected in SIV creation 112. With this arrangement, the cycle represented by SIV creation 112, internal analysis 114, identify changes 116, and response 118 provides a mechanism for self-assessment by a device.

Figure 2:
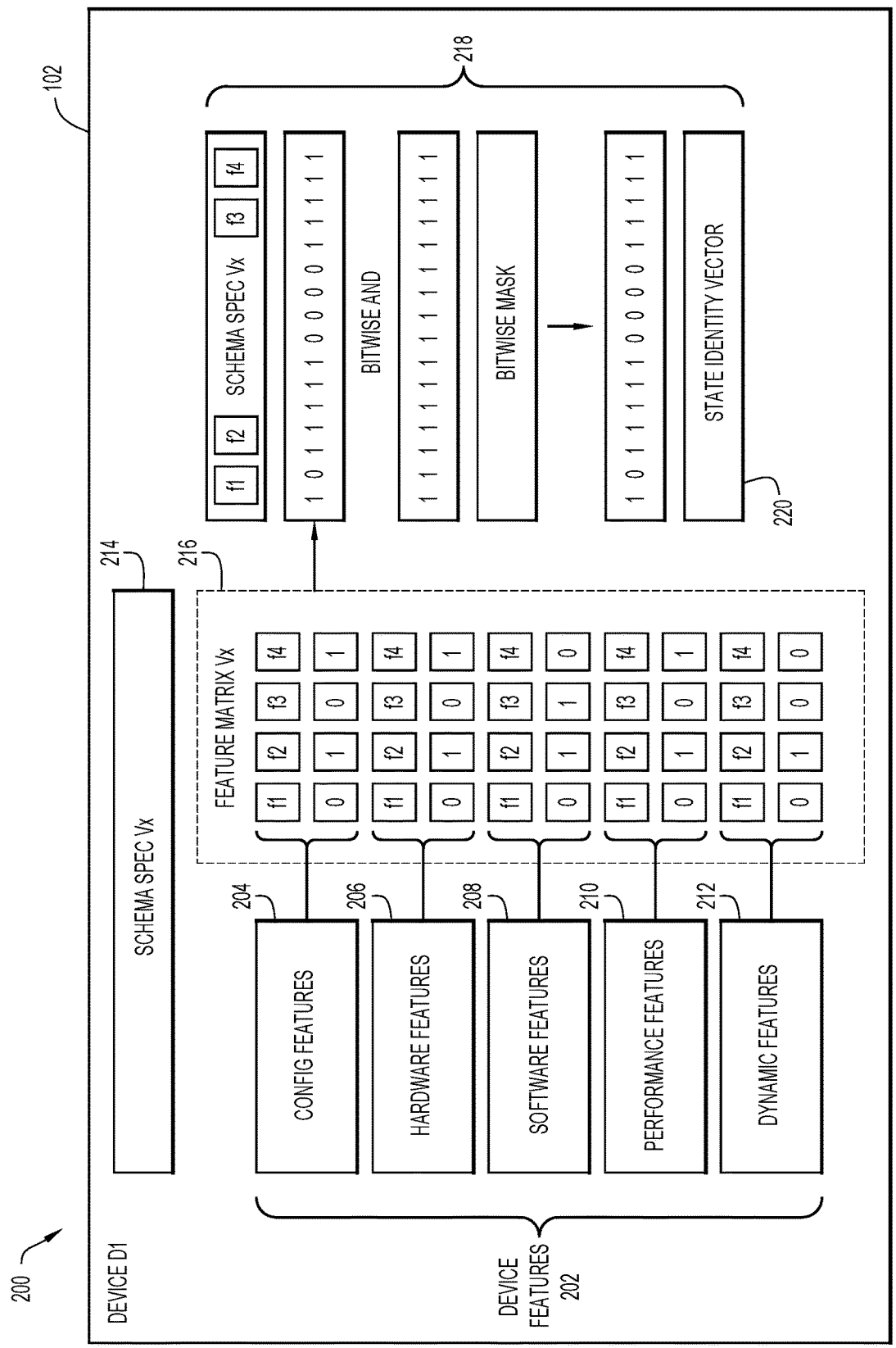
FIG. 2 is a block diagram of a process for generating a state identity vector for a network device, according to an example embodiment.

FIG. 2 is an illustration of an example process 200 for generating an SIV or device fingerprint 220 for a network device (e.g., first network device 102), which process may be performed as part of SIV creation 112, described above. In this embodiment, process 200 for generating SIV or device fingerprint 220 for first network device 102 includes determining one or more features of a plurality of device features 202 that are associated with first network device 102. Plurality of device features 202 includes different types or categories of device features, including: network configuration features 204 (e.g., whether the device supports or operates in accordance with different routing protocols, such as Open Shortest Path First (OSPF) or the Border Gateway Protocol (BGP)); hardware features 206 (e.g., hardware components, a device hardware vendor model number, etc.); software features 208 (e.g., which operating system and versions thereof that the device supports/hosts); performance features 210; and dynamic features 212 (e.g., whether or not the device has experienced a failure or crash). It should be understood that plurality of features 202 described herein for each category are exemplary and plurality of features 202 may include additional features that are associated with a network device.

In some embodiments, plurality of features 202 may be associated with a predetermined schema specification 214 (e.g., "Schema Spec Vx", where "V" represents "Version") that defines names of device features and bit positions of the device features in the device fingerprints/SIVs, along with related information for the features, such as instructions for making changes and/or responsive actions. Schema specification 214 is versioned so that all devices using schema specification 214 can coordinate and align using the same version.

A network device (e.g., first network device 102) compiles the different types and categories of device features 204, 206, 208, 210, 212 into corresponding portions of a feature matrix Vx 216, as shown in FIG. 2. In feature matrix Vx 216, column labels "f1," "f2," "f3," "f4," and so on, represent different attributes of each feature type, and bit values "0" or "1" under each column label represent a presence or an absence of the corresponding feature attribute for the given device, for example, for first network device 102.

At an operation 218, first network device 102 performs bitwise AND and masking operations on feature information for first network device 102 based on feature matrix Vx 216 to produce device fingerprint/SIV 220. In this embodiment, the mask applied (i.e., containing all "1"s) is a standard feature vector that is used to determine the identity of first network device 102 (i.e., produce device fingerprint/SIV 220). Device fingerprint/SIV 220 includes a multi-bit word in which bit positions represents respective device features/attributes from plurality of features 202, and bit values (e.g., "1" or "0") populating those positions represent presence or absence of the corresponding features. In an example embodiment, a device identifier (ID) may be concatenated with device fingerprint/SIV 220.

Figure 3:
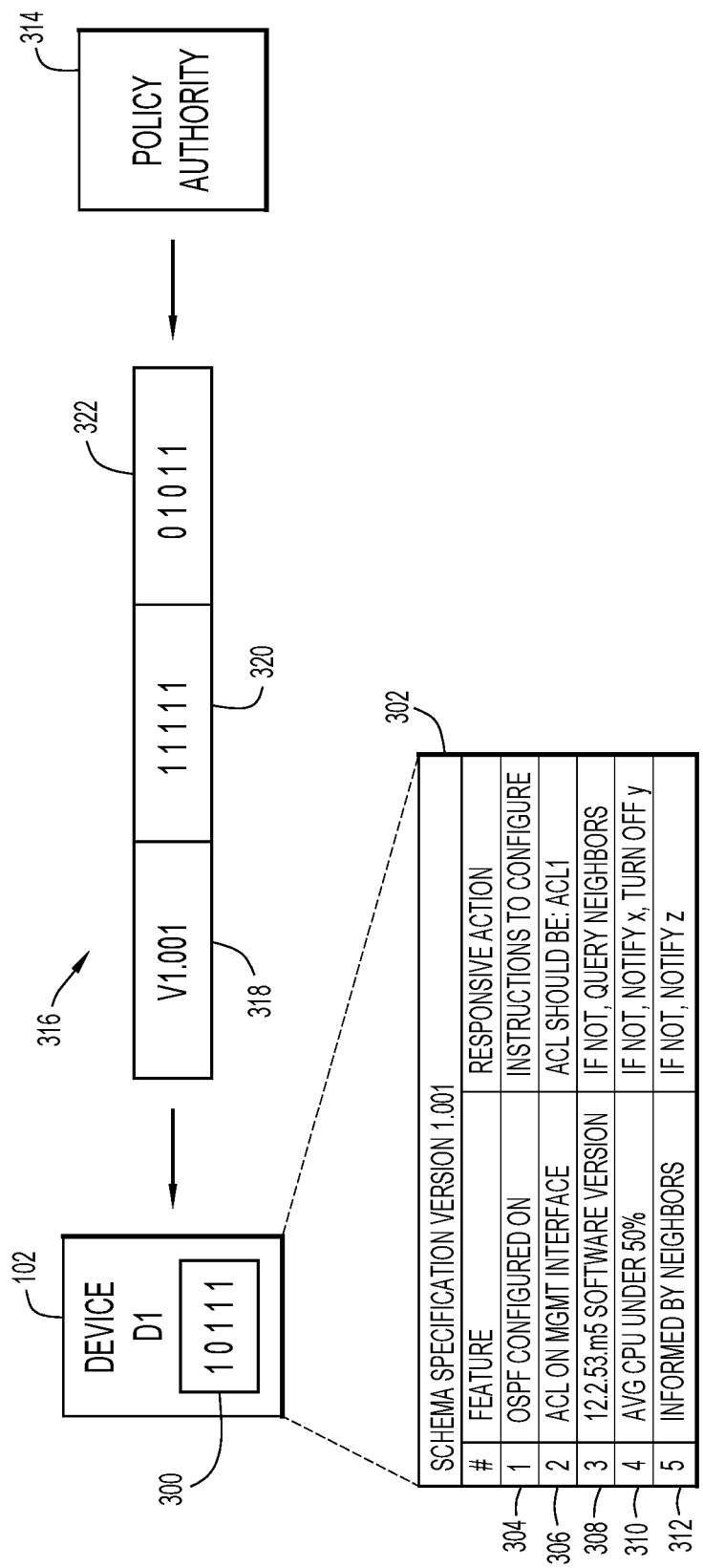
FIG. 3 is an illustration of a network device obtaining a network policy, according to an example embodiment.

FIG. 3 illustrates a network device obtaining a network policy, according to an example embodiment. In this embodiment, a network device (e.g., first network device 102) is associated with a device fingerprint/SIV 300 (e.g., 10011). As described above, device fingerprint/SIV 300 includes a plurality of positions that each represent a feature associated with first network device 102. These features may be described, along with associated instructions and/or responsive actions, by a schema 302. Schema 302 includes static, dynamic, and derived states of values of interest for the plurality of features that may be implemented in a given domain (e.g., network 100). In this embodiment, schema 302 may already be stored at first network device 102. In other embodiments, schema 302 may be provided to a network device (e.g., first network device 102) from another device in the network, including, for example, a neighbor network device and/or a central controller, such as network controller 110.

In this embodiment, schema 302 includes five features: a first feature 304 associated with Open Shortest Path First (OSPF) configured on, a second feature 306 associated with an Access Control List (ACL) present on a management (MGMT) interface, a third feature 308 associated with a specific software version (i.e., 12.2.53.m5), a fourth feature 310 associated with an average Central processing unit (CPU) usage under a specific percentage (i.e., under 50%), and a fifth feature 312 associated with being informed by neighbor network devices. Five features of a plurality of features are shown in FIG. 3 for exemplary purposes, however, it should be understood that a network device may have any number of features, which may be defined by schema 302.

In this embodiment, first network device 102 obtains or receives a policy 316 from a policy authority 314. In some embodiments, policy authority 314 may be a central controller for network 100, such as, network controller 110. In other embodiments, policy authority 314 may be a master node or device in the network configured to provide policy information to other devices in the network. In still other embodiments, policy authority 314 may be one or more neighbor network devices, for example, as described below in reference to FIGS. 8 and 9.

Policy 316 from policy authority 314 includes a combination of features relevant to the particular policy being implemented, along with desired values or states for that combination of features. In particular, it should be noted that a given policy includes a combination of features from a plurality of possible features (e.g., plurality of features 202) that are relevant to that policy. As a result, a policy may not address all features of a network device. Accordingly, a mask used to identify the policy indicates which positions representing features relevant to the policy are applicable to the policy and which are not. This may be achieved by using ones ("1") and zeros ("0") to indicate "ON" or "OFF", where a one indicates that a feature represented by a position is relevant to the policy (i.e., "ON") and a zero indicates that a feature represented by a position is not relevant to the policy (i.e., "OFF").

Policy 316 may include requested changes to one or more features of a network device. The requested changes are provided to the network device using a SIV format with a mask to indicate a desired state for the relevant features of the device. The SIV provided with the policy can be variable length to allow for a small amount of information or a large amount of information to be provided, depending on the combination of features associated with the desired policy or policies. For example, as shown in FIG. 3, policy 316 from policy authority 314 includes information associated with a schema version 318 (i.e., V1.001), a mask 320 to identify the receiving network device, and a policy mask 322 that indicates the combination of features that are relevant to policy 316 and their desired values.

Figure 4:
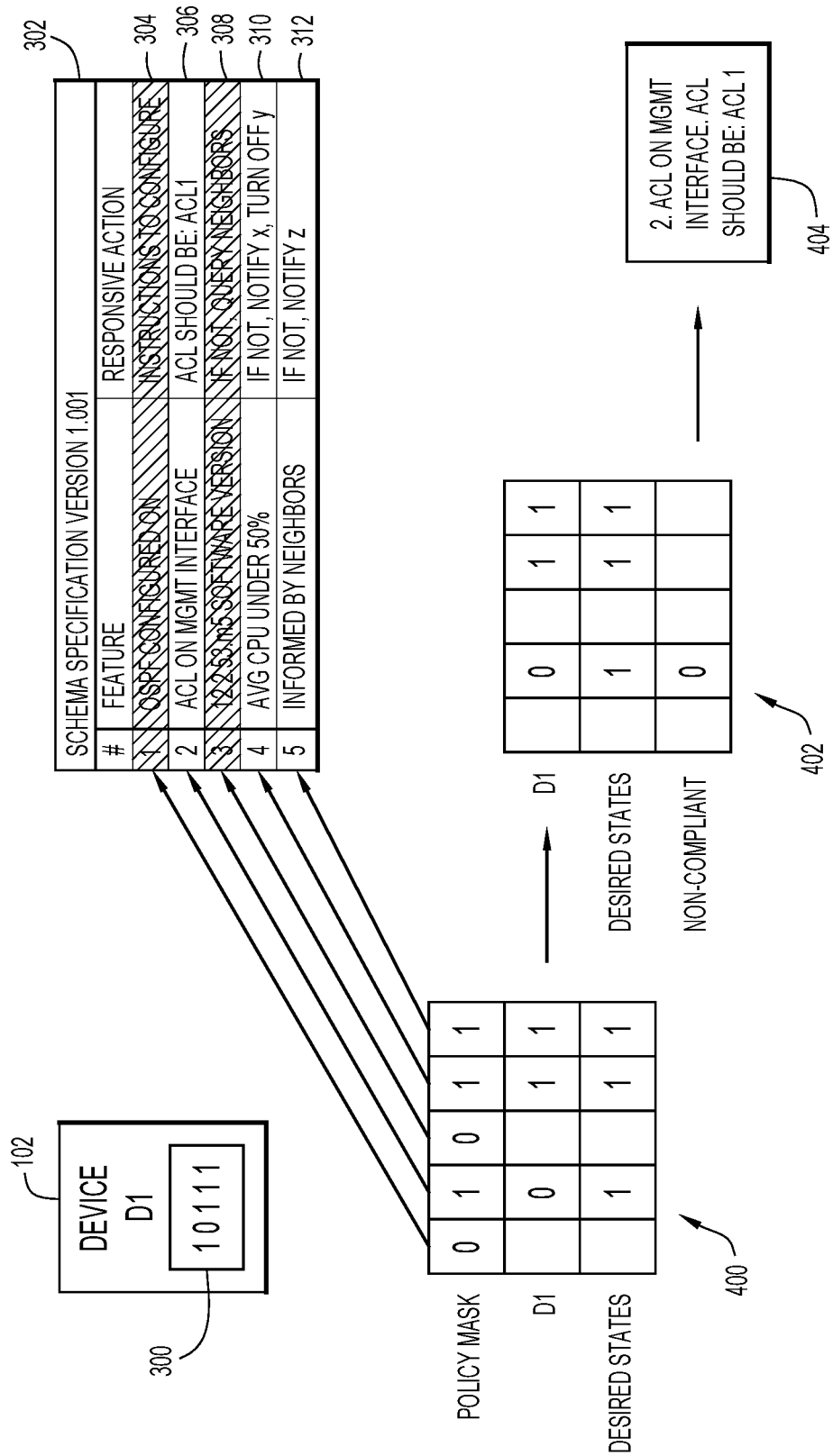
FIG. 4 is an illustration of a network device implementing self-assessment of a state identity vector to determine compliance with a network policy, according to an example embodiment.

With reference to FIG. 4, first network device 102 is illustrated implementing self-assessment of a state identity vector to determine compliance with network policy 316, according to an example embodiment. In an example embodiment, first network device 102 obtains policy 316 and performs a comparison 400 with its device fingerprint/SIV 300. In this embodiment, policy 316 includes a combination of features and a set of desired values that are relevant to second feature 306, fourth feature 310, and fifth feature 312 (i.e., policy mask 320 includes ones at positions 2, 4, and 5). Additionally, it should be noted that the remaining features, including first feature 304 and third feature 308, are not relevant to policy 316. In other words, the combination of features associated with policy 316 does not include and is not concerned with values for those features (i.e., policy mask 320 includes zeros at positions 1 and 3).

Based on comparison 400, first network device 102 determines the set of desired values for the combination of features identified by policy 316 (represented by is at positions 2, 4, and 5). First network device 102 may then determine compliance 402 with policy 316 by comparing the set of desired values for the combination of features identified by policy 316 with the corresponding values of associated features included in device fingerprint/SIV 300. As a result of determining compliance 402, first network device 102 identifies one or more features included in the combination of features of policy 316 that are not in compliance. In this embodiment, first network device 102 identifies that its value for second feature 306 is not in compliance with the desired value of that feature from policy 316. Accordingly, first network device 102 may make the required changes to be in compliance with policy 316 by consulting instructions and associated responsive actions included in schema 302 for the feature that is not in compliance with policy 316.

Schema 302 includes an associated responsive action for second feature 306 that indicates to first network device 102 that the ACL that should be present on the MGMT interface is ACL1. For example, ACL1 may be a specific ACL that is provided to first network device from a central controller (e.g., network controller 110) or from another network device in network 100. As a result, using schema 302, first network device 102 may implement a responsive action 404 to obtain ACL1 and thereby obtain compliance with second feature 306 of policy 316.

Figure 5:
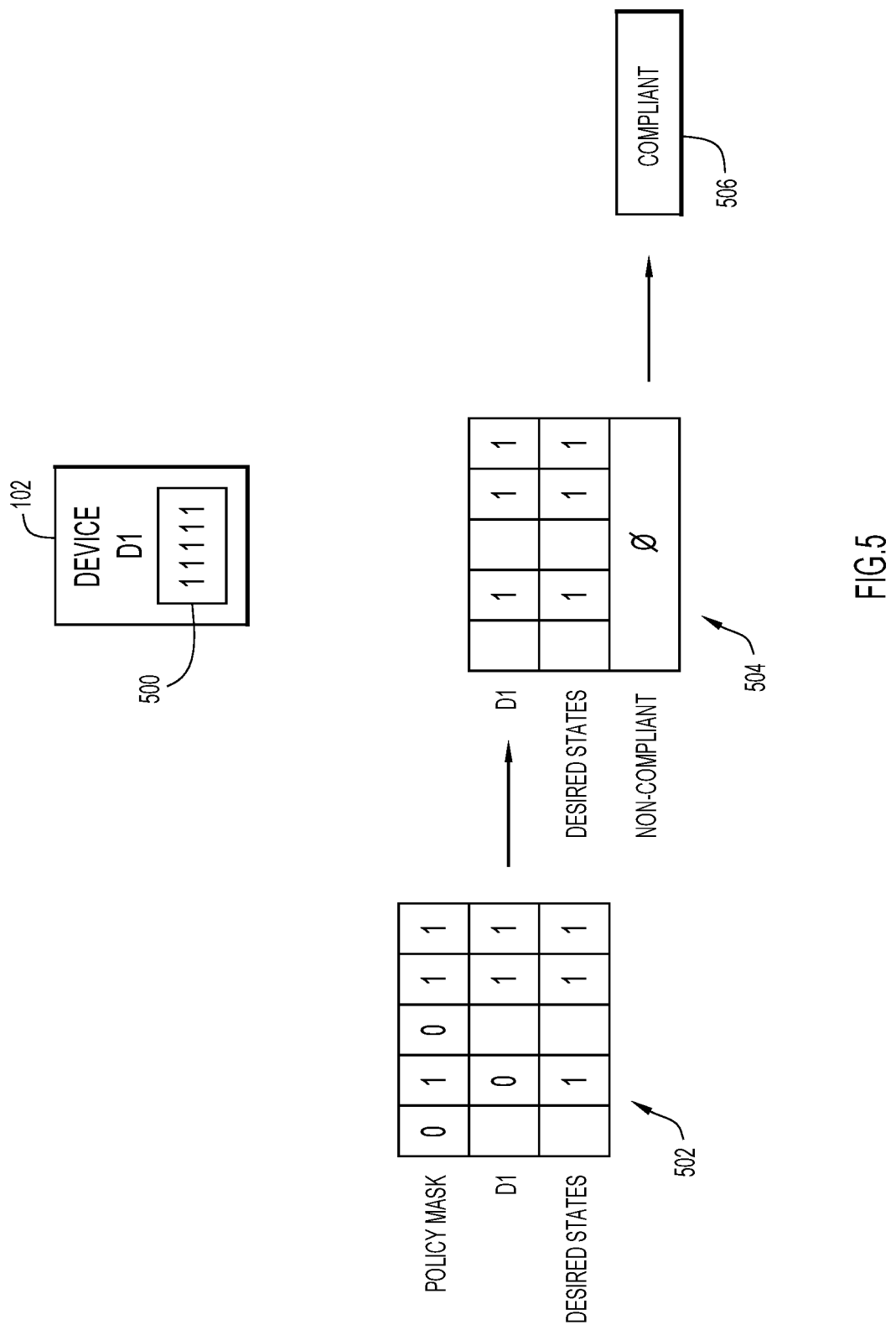
FIG. 5 is an illustration of a network device implementing self-assessment of a state identity vector that is in compliance with a network policy, according to an example embodiment.

FIG. 5 illustrates first network device 102 implementing self-assessment of a new state identity vector/device fingerprint 500 that is in compliance with a network policy, according to an example embodiment. Upon implementing responsive action 404 (as described above in reference to FIG. 4), first network device 102 has changed one or more features associated with its previous device fingerprint/SIV 300 to be in compliance with policy 316. Accordingly, first network device 102 will now have a new device fingerprint/SIV 500 that reflects the changes implemented by responsive action 404. In this embodiment, first network device 102 compares new device fingerprint/SIV 500 to policy 316 at comparison 502.

Based on comparison 502, first network device 102 determines the set of desired values for the combination of features identified by policy 316 (represented by is at positions 2, 4, and 5). First network device 102 may then determine compliance 504 with policy 316 by comparing the set of desired values for the combination of features identified by policy 316 with the corresponding values of associated features included in new device fingerprint/SIV 500. As a result of determining compliance 504, first network device 102 determines that there are no non-compliant values or states for the combination of features included with policy 316 (i.e., the result is an empty set). In other words, new device fingerprint/SIV 500 is determined to be compliant 506 with policy 316.

In addition, new device fingerprint/SIV 500 now represents the current and most recent state of first network device 102, including its features and associated values or states. Further analysis or self-assessment, for example, with a second policy, may be performed by first network device 102 using this new device fingerprint/SIV 500. In some embodiments, previous or past device fingerprints/SIVs (e.g., device fingerprint/SIV 300) may be stored by first network device 102 locally, on an immutable blockchain system, and/or at a centralized storage location. By having access to both past and current schemas and states, a network device may have a wide variety of information for which to take action. For example, this past and current information may be used for complete on-box analytics in order for a network device to self-maintain using all available mechanisms and/or may provide past or current schema, feature information, or policies to other network devices.

Figure 6:
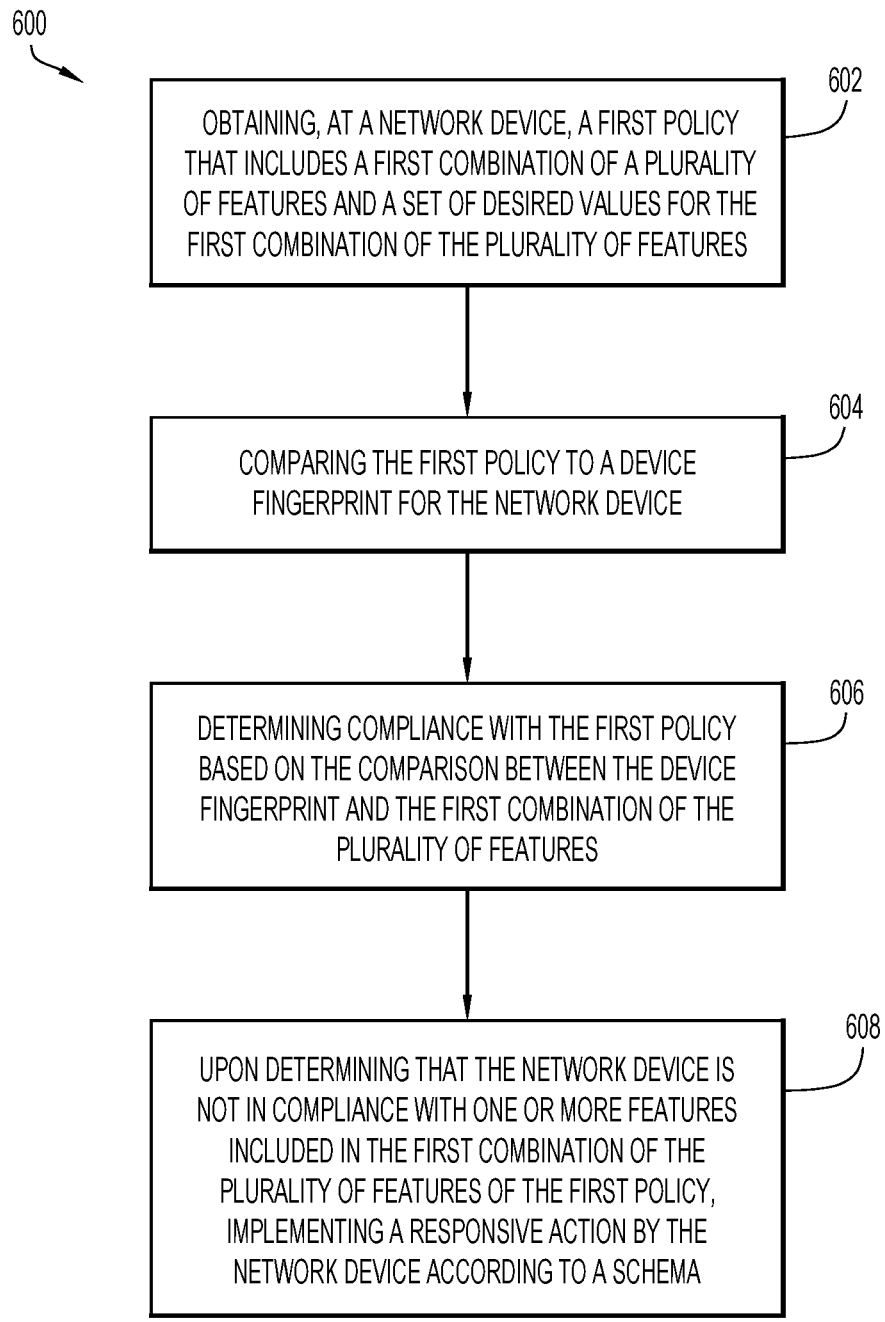
FIG. 6 is a flowchart of a method for self-assessment using a state identity vector, according to an example embodiment.

FIG. 6 illustrates a flowchart of a method 600 for self-assessment using a state identity vector, according to an example embodiment. In some embodiments, method 600 may be performed by a network device, for example, first network device 102. In an example embodiment, method 600 for self-assessment using a state identity vector may begin with an operation 602. Operation 602 includes obtaining, at a network device, a first policy that includes a first combination of a plurality of features and a set of desired values for the first combination of features. For example, as described above in reference to FIG. 3, first network device 102 may obtain policy 316 that identifies a combination of features relevant to the policy (e.g., second feature 306, fourth feature 310, and fifth feature 312, which are identified by policy mask 320 including ones at positions 2, 4, and 5).

Next, method 600 includes an operation 604 where the network device (e.g., first network device 102) compares the first policy to a device fingerprint (or SIV) for the network device. As described above, the device fingerprint/SIV includes a multi-bit word in which bit positions represents respective device features/attributes from a plurality of features, and bit values (e.g., "1" or "0") populating those positions represent presence or absence of the corresponding features. Because a given policy may only address some features of a device (e.g., the features identified by the positions included in a policy mask associated with the policy), at operation 804, only the features of a device associated with the relevant positions of the device fingerprint/SIV are compared to the combination of features of the policy. For example, as shown in FIGS. 4 and 5, first network device 102 compares corresponding features of device fingerprint/SIV 300 to the relevant features of policy 316 (i.e., identified by the policy mask).

At an operation 606, the network device determines whether it is in compliance with the first policy based on the comparison at operation 604 between the relevant features of device fingerprint/SIV and the first combination of the plurality of features included in the first policy (i.e., identified by the policy mask). For example, first network device 102 determines whether it is in compliance with the desired states of policy 316 at operation 402 in FIG. 4 (e.g., non-compliance for at least one feature) and operation 504 in FIG. 5 (e.g., compliance for all policy features).

Method 600 also includes an operation 608, where, upon determining that the network device is not in compliance with one or more features included in the first combination of the plurality of features of the first policy, the network device implements a responsive action. The responsive action implemented by the network device is determined according to the schema, which includes instructions and/or responsive actions associated with one or more features associated with the network device. For example, as shown in FIGS. 3 and 4, schema 302 includes responsive actions associated with each of features 304, 306, 308, 310, 312 for first network device 102 to implement when not in compliance with a given policy. Accordingly, in the example shown in FIG. 4, when first network device 102 is not in compliance with the desired state or value for second feature 308 as indicated by policy 316, schema 302 includes a respective responsive action to be taken to be in compliance. Schema 302 may include responsive actions that may automatically correct or change the feature to be in compliance and/or may also include responsive actions that notify or alert an entity or administrator that can implement the required changes to the network device.

In some embodiments, method 600 may be repeated for additional policies. For example, first network device 102 may obtain or receive a second policy that includes a second combination of the plurality of features and a set of desired values or states for that second combination. In this example, the second combination of features associated with the second policy is different than the first combination of features associated with the first policy. First network device 102 may proceed with operations 604, 606, 608 of method 600 to compare this second policy to the device fingerprint/SIV, determine whether the network device is in compliance with the second policy, and take any responsive actions to bring any non-compliance features into compliance with the second policy. With this arrangement, a network device may use the same device fingerprint/SIV for self-assessment to determine compliance with multiple different policies, each having its own unique combination of features and required values.

Figure 7:
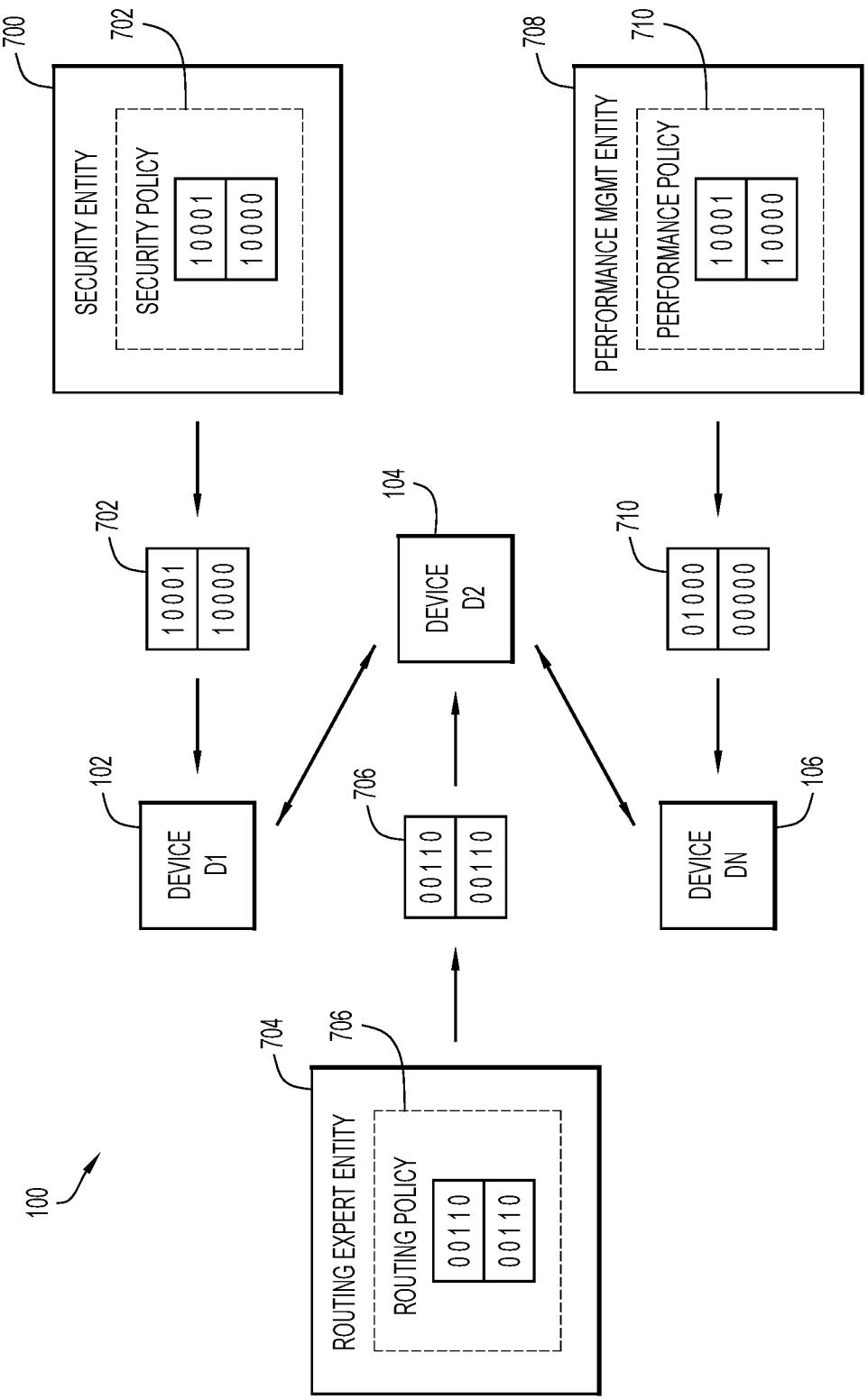
FIG. 7 is a diagram of a network including a plurality of devices in which self-assessment of a plurality of network policies may be implemented, according to an example embodiment.

The principles of the example embodiments described herein provide techniques for system self-assessment using a device fingerprint/SIV that allow complex systems to comply with one or more policies autonomously. Referring now to FIG. 7, network 100 is illustrated including a plurality of devices in which self-assessment of a plurality of network policies may be implemented, according to an example embodiment. As shown in this embodiment, network 100 includes plurality of devices, including first network device 102, second network device 104, and nth network device 106. Each network device is associated with its own device fingerprint/SIV that allows each device to self-assess compliance with various policies.

For example, as shown in FIG. 7, a plurality of entities may implement different policies to network devices in network 100. A security entity 700 may implement a security policy 702, having a combination of features and a set of desired values for network devices that relate to security issues. Another entity, for example, a routing expert entity 704 may implement a routing policy 706 that relates to routing traffic to/from network devices. Routing policy 706 has a combination of features and a set of desired values for network devices that are different than those associated with security policy 702. Similarly, a performance management entity 708 may also implement a performance policy 710 that has a combination of features and a set of desired values for network devices that are different than both security policy 702 and routing policy 706.

Additionally, network devices in network 100 (e.g., plurality of network devices 102, 104, 106) may exchange or share one or more of policies 702, 706, 710 with each other. In this manner, a plurality of entities (e.g., security entity 700, routing entity 704, and/or performance management entity 708) may distribute a policy to one network device and the network devices may distribute that policy to other network devices in the network. With this arrangement, network devices may perform self-assessment and self-adjust or change, as needed, to comply with each of the relevant policies in accordance with the instructions and/or responsive actions included in the schema.

In some embodiments, network devices in a network may share or exchange policies and/or information associated with a state or feature using a state exchange protocol (SEP). For example, some systems or devices may have an expectation of a peer device state to allow the system or other devices to successfully interact with that peer device. Convergence of some systems cannot occur until two peer devices are both ready and able to interact with each other. In these circumstances, the systems or devices may use a generalized mechanism to continuously engage, notify, and/or query each other for state expectations so that interaction between them can begin, continue, or resume based on state changes requested by one side or the other. The state exchange protocol (SEP) described herein provides a mechanism to allow network devices to exchange information associated with their device fingerprint/SIV, relevant policies for the network, and desired states or values for features associated with those policies.

Figure 8:
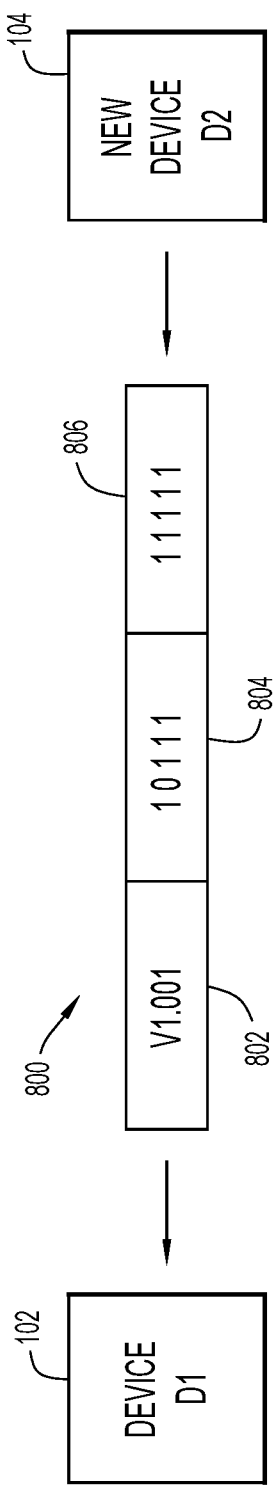
FIG. 8 is an illustration of two network devices exchanging state identity information using a state exchange protocol (SEP), according to an example embodiment.
Figure 9:
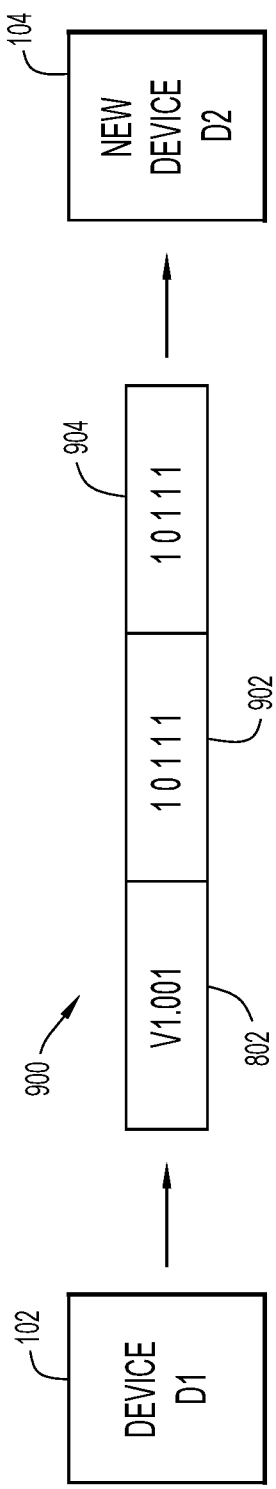
FIG. 9 is an illustration of a network device providing a network policy to another device using SEP, according to an example embodiment.

Referring now to FIGS. 8 and 9, a state exchange protocol (SEP) allows peer devices, i.e., network devices on the same network, to learn and share capabilities/features using their device fingerprint/SIV. While systems and network devices may generate and use the device fingerprint/SIV alone to self-assess compliance with a policy or policies, in some circumstances, network devices may need information about other network devices. For example, Internet-of-Things (IoT) devices or nodes in a data center may pass certain requirements between themselves to establish or setup on the network. Accordingly, the SEP described herein may be used by network devices to share information associated with their device fingerprint/SIV, relevant policies for the network, and desired states or values for features.

FIG. 8 illustrates two network devices exchanging state identity information using a state exchange protocol (SEP), according to an example embodiment. In this embodiment, first network device 102 is present in network 100 and a new device, for example, second network device 104, joins or comes online to network 100. According to the principles of the example embodiments, second network device 104 may announce itself to its neighbor devices (in this case, first network device 102) using a message 800 sent according to the state exchange protocol (SEP).

In this embodiment, message 800 from second network device 104 to first network device 102 includes a portion 802 that identifies the version of schema being used by second network device 104. For example, portion 802 of message 800 identifies the schema version as "V1.001", which also matches the version associated with schema 302 being used by first network device 102 (as shown in FIGS. 3 and 4). Next, a portion 804 of message 800 identifies a device fingerprint/SIV for second network device 104 (e.g., "10111"). Additionally, a portion 806 of message 800 identifies the full state of second network device 104 is being sent (e.g., "11111"). Upon receiving message 800, first network device 102 may compare the state of second network device 104 to a known or existing policy for network 100.

Referring now to FIG. 9, first network device 102 may send a response to second network device 104 using SEP to send a message 900. In this embodiment, message 900 from first network device 102 includes portion 802 also identifying the same version of the schema is being used by first network device 102 (e.g., "V1.001") and including a portion 902 that includes a desired policy for second network device 104 (e.g., "10111") using a policy mask. That is, policy mask "10111" indicates that features associated with positions 1, 3, 4, and 5 are relevant to the policy. In this embodiment, message 900 also includes a portion 904 that identifies the relevant policy desired states or values for each feature of the policy that are to be followed by second network device 104 for the features identified in portion 902. For example, the policy identified by portion 902 of message 900 may be policy 316 provided by policy authority 314 to first network device 102, as described in reference to FIG. 3 above. With this arrangement, network devices may use SEP to share information associated with device fingerprints/SIVs, relevant policies for the network, and desired states or values for features.

In some embodiments, multiple types of messages may be exchanged between network devices using SEP to allow for a two-way exchange of information. For example, types of message may include: (1) an "I AM" message using device fingerprint/SIV to tell the other device its features/capabilities; (2) an "I NEED" message that includes initial state expectations based on results of an I AM message and SIV analysis by each device; (3) an "I CARE" message that is a mask only SIV that defines what features/capabilities a neighbor device would like to be kept aware of; (4) a "YOU STATE CHANGE" message that includes changes a device would like another device to make; (5) a "ME STATE CHANGE" message that includes changes made to a device that relate to a need or expectation of another device; (6) an "I NEED HELP" message that a device cannot understand a requirement contained in another message; (7) an "UNSUPPPORTED" message that a requirement cannot be met; and/or (8) a "CHANGE COMPLETE" message to indicate that a requested change has been made by a device. It should be understood that the types of messages that may be exchanged using SEP described herein are exemplary and other messages may also be exchanged.

The principles of the example embodiments described herein for exchanging messages using SEP may be used in various scenarios. For example, SEP may be used for Network Functions Virtualization (NFV), NFV Infrastructure (NFVI), and cloud use cases that involve deploying software resources on a remote environment. Conventionally, determining whether or not the environment is set up and ready for deployment involves manual checking of the network devices. According to the principles described herein, a policy for the remote environment may be defined before deployment, with the policy including features and capabilities that devices need for a successful deployment. This policy may be shared by devices on the network using SEP as described above, thereby reducing or eliminating the manual checking typically required.

The example embodiments may be applied to other use cases. For example, conventionally, deploying common maximum transmission unit (MTU) settings in a network can be difficult due to differences in platforms. According to the principles described herein, devices can use SEP to exchange and agree upon an MTU for their purposes. In other words, by using SEP to exchange information, the devices can self-adjust MTU settings.

The example embodiments may also be used for intent based networking policy propagation. The schema instructions allow for distributed intelligence and self-awareness at the device level using device fingerprints/SIVs. With these techniques, a policy or policies can be brought into compliance by the device itself immediately upon determining that one or more features are not in compliance with a given policy.

In addition, the example embodiments may also provide solutions for a number of other problems that can arise in the context of computer networks and networking. For example, SEP may be used by devices to exchange information about software running on each device and/or to obtain the software or updates to the latest version. Historical information may be used to determine good or bad states by analyzing device fingerprints/SIVs before and after an incident. Policies may be continued to be enforced even when a device is disconnected from a central authority by using the last known device fingerprint/SIV before the disconnection. A device may derive its own role in a network using the schema and its device fingerprint/SIV.

Figure 10:
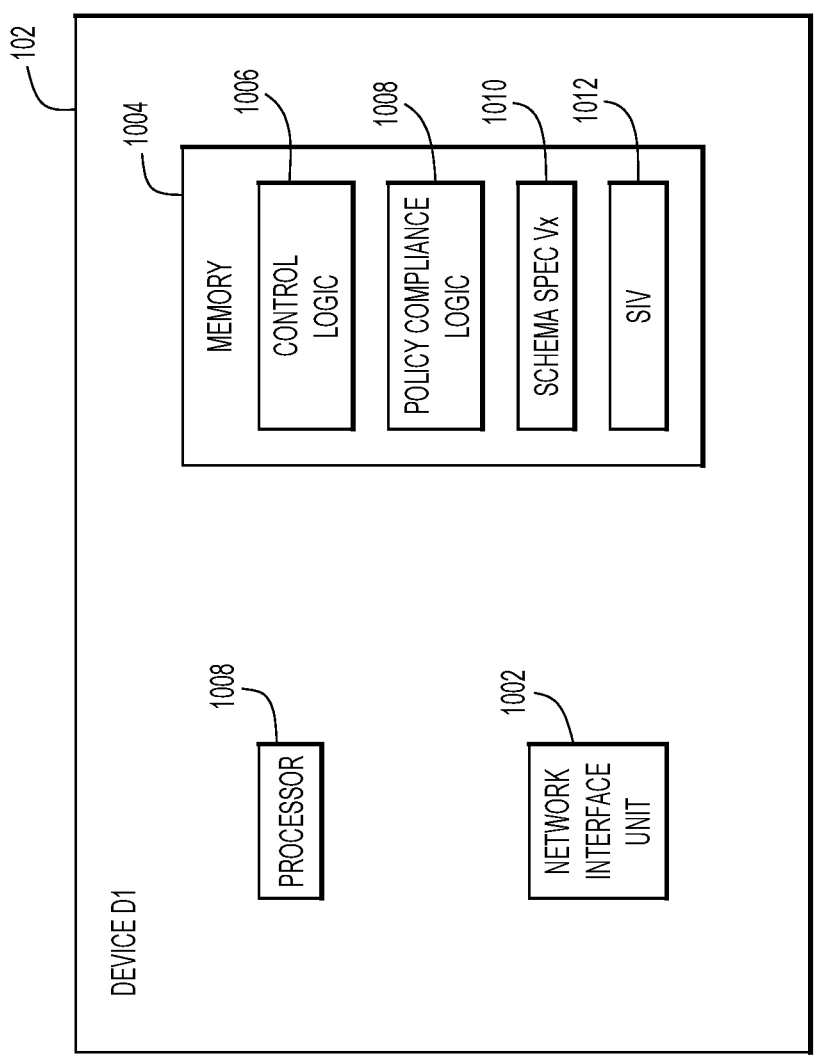
FIG. 10 is a block diagram of a network device in which techniques for system self-assessment using a state identity vector may be implemented, according to an example embodiment.

With reference to FIG. 10, a hardware block diagram for a network device, for example, first network device 102, is shown according to an example embodiment. In this embodiment, first network device 102 includes one or more processors 1000, a network interface unit (NIU) 1002, and a memory 1004. Memory 1004 stores control software 1006 (referred as "control logic"), that when executed by the processor(s) 1000, causes the network device to perform the various operations described herein. Memory 1004 also includes a policy compliance logic 1008, that when executed by processor(s) 1000, causes the network device to perform self-assessment of its features compared to one or more policies, as described above. Memory 1004 also stores a schema 1010 and device fingerprint/SIV 1012. Policy compliance logic 1008 may use schema 1010 and device fingerprint/SIV 1012 to determine whether or not features of first network device 102 are in compliance with relevant policies, as described above in connection with operations 402, 504, and/or operations of method 600.

The processor(s) 1000 may be a microprocessor or microcontroller (or multiple instances of such components). The NIU 1002 enables first network device 102 to communicate over wired connections or wirelessly with a network (e.g., with one or more of network devices 104, 106 in network 100). NIU 1002 may include, for example, an Ethernet card or other interface component having a connection port that enables first network device 102 to communicate over network 100 via the connection port. In a wireless embodiment, NIU 1002 may include a wireless transceiver and an antenna to transmit and receive wireless communication signals to and from the network.

The memory 1004 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1004 may comprise one or more tangible (non-transitory) computer readable storage media (e.g., memory device(s)) encoded with software or firmware that comprises computer executable instructions. For example, control software 1006 includes logic to implement operations of the network device. Control software 1006 also includes logic to implement/generate for display graphical user interfaces (GUIs) as necessary in connection with the above described methods/operations.

The techniques according to the example embodiments described herein allow devices to create dynamic device fingerprints/SIVs that can be used for self-assessment and repair for all manner of configuration, software, policy, and/or security changes. Conventional data collection and feature engineering can take well over 80% of analysts' time for ongoing analytics analysis, and by then, the data may be out of sync with the system. The device fingerprint/SIV and schema of the present embodiments eliminate this problem by providing an accurate, real-time state and data model for the system that is generated by each device in the system. Additionally, storage of past device fingerprints/SIVs can provide a large supply of historical data for local analysis and analytics.

In addition, the state exchange protocol (SEP) described herein provides a generalized method for peers and systems to self-adjust as needed in order to have autonomous operations of the system. SEP is a lightweight protocol implementation for peer to peer communication using device fingerprints/SIVs for information exchange. SEP allows participating devices to use device fingerprints/SIVs for the purposes of informing neighbors of expectations, learning expectations from neighbors, and enabling dynamic reconfiguring of environments to meet various policy requirements.

In one form, a computer-implemented method is provided comprising: obtaining, at a network device, a first policy that includes a first combination of a plurality of features and a set of desired values for the first combination of the plurality of features; comparing the first policy to a device fingerprint for the network device, the device fingerprint comprises a multi-bit word having a plurality of positions, and wherein each position represents a feature associated with the network device; determining whether the network device is in compliance with the first policy based on the comparison between the device fingerprint and the first combination of the plurality of features; and upon determining that the network device is not in compliance with one or more features included in the first combination of the plurality of features of the first policy, implementing a responsive action by the network device according to a schema that defines instructions for each feature represented by the plurality of positions in the device fingerprint.

In another form, an apparatus is provided comprising: a network interface configure to send data to and receive data from a network; and a processor coupled to the network interface unit and configured to: obtain a first policy that includes a first combination of a plurality of features and a set of desired values for the first combination of the plurality of features; compare the first policy to a device fingerprint for the apparatus, the device fingerprint comprises a multi-bit word having a plurality of positions, and wherein each position represents a feature associated with the apparatus; determine whether the apparatus is in compliance with the first policy based on the comparison between the device fingerprint and the first combination of the plurality of features; and upon determining that the apparatus is not in compliance with one or more features included in the first combination of the plurality of features of the first policy, implement a responsive action by the apparatus according to a schema that defines instructions for each feature represented by the plurality of positions in the device fingerprint.

In yet another form, a non-transitory computer readable medium encoded with instructions is provided. The instructions, when executed by a processor of a network device, cause the processor to perform: obtaining a first policy that includes a first combination of a plurality of features and a set of desired values for the first combination of the plurality of features; comparing the first policy to a device fingerprint for the network device, the device fingerprint comprises a multi-bit word having a plurality of positions, and wherein each position represents a feature associated with the network device; determining whether the network device is in compliance with the first policy based on the comparison between the device fingerprint and the first combination of the plurality of features; and upon determining that the network device is not in compliance with one or more features included in the first combination of the plurality of features of the first policy, implementing a responsive action by the network device according to a schema that defines instructions for each feature represented by the plurality of positions in the device fingerprint.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
obtaining, at a network device, a first policy that includes a first combination of a plurality of features and a set of desired values for the first combination of the plurality of features;
comparing, at the network device, the first policy to a device fingerprint for the network device, the device fingerprint comprises a multi-bit word having a plurality of positions, and wherein each position represents a feature associated with the network device;
determining whether the network device is in compliance with the first policy based on comparing the device fingerprint to the first combination of the plurality of features; and
upon determining that the network device is not in compliance with one or more features included in the first combination of the plurality of features of the first policy, implementing a responsive action by the network device according to a schema that defines instructions for each feature represented by the plurality of positions in the device fingerprint.

2. The method of claim 1, wherein the schema includes instructions for responsive actions to be taken by the network device when not in compliance with each feature represented by the plurality of positions in the device fingerprint.

3. The method of claim 1, wherein the first policy and the set of desired values are included with a first mask received by the network device.

4. The method of claim 3, wherein the first mask indicates to the network device which positions in the device fingerprint correspond to the first combination of the plurality of features of the first policy.

5. The method of claim 1, further comprising:
obtaining, at the network device, a second policy that includes a second combination of the plurality of features and a set of desired values for the second combination of the plurality of features, wherein the second combination of the plurality of features is different than the first combination of the plurality of features of the first policy.

6. The method of claim 5, further comprising:
comparing the second policy to the device fingerprint for the network device;
determining whether the network device is in compliance with the second policy based on comparing the device fingerprint to the second combination of the plurality of features; and
upon determining that the network device is not in compliance with one or more features included in the second combination of the plurality of features of the second policy, implementing another responsive action by the network device according to the schema.

7. The method of claim 1, wherein the first policy is obtained by the network device from at least one of a network controller or a second network device.

8. An apparatus comprising:
a network interface configure to send data to and receive the data from a network; and
a processor coupled to the network interface and configured to:
obtain a first policy that includes a first combination of a plurality of features and a set of desired values for the first combination of the plurality of features;
compare the first policy to a device fingerprint for the apparatus, the device fingerprint comprises a multi-bit word having a plurality of positions, and wherein each position represents a feature associated with the apparatus;
determine whether the apparatus is in compliance with the first policy based on comparing the device fingerprint to the first combination of the plurality of features; and
upon determining that the apparatus is not in compliance with one or more features included in the first combination of the plurality of features of the first policy, implement a responsive action by the apparatus according to a schema that defines instructions for each feature represented by the plurality of positions in the device fingerprint.

9. The apparatus of claim 8, wherein the schema includes instructions for responsive actions to be taken by the apparatus when not in compliance with each feature represented by the plurality of positions in the device fingerprint.

10. The apparatus of claim 8, wherein the first policy and the set of desired values are included with a first mask received by the apparatus.

11. The apparatus of claim 10, wherein the first mask indicates to the apparatus which positions in the device fingerprint correspond to the first combination of the plurality of features of the first policy.

12. The apparatus of claim 8, wherein the processor is further configured to:
obtain a second policy that includes a second combination of the plurality of features and a set of desired values for the second combination of the plurality of features, wherein the second combination of the plurality of features is different than the first combination of the plurality of features of the first policy.

13. The apparatus of claim 12, wherein the processor is further configured to:
compare the second policy to the device fingerprint;
determine whether the apparatus is in compliance with the second policy based on comparing the device fingerprint to the second combination of the plurality of features; and
upon determining that the apparatus is not in compliance with one or more features included in the second combination of the plurality of features of the second policy, implement another responsive action by the apparatus according to the schema.

14. The apparatus of claim 8, wherein the first policy is obtained by the apparatus from at least one of a network controller or a network device.

15. A non-transitory computer readable medium encoded with instructions that, when executed by a processor of a network device, cause the processor to perform:
obtaining a first policy that includes a first combination of a plurality of features and a set of desired values for the first combination of the plurality of features;
comparing the first policy to a device fingerprint for the network device, the device fingerprint comprises a multi-bit word having a plurality of positions, and wherein each position represents a feature associated with the network device;
determining whether the network device is in compliance with the first policy based on comparing the device fingerprint to the first combination of the plurality of features; and
upon determining that the network device is not in compliance with one or more features included in the first combination of the plurality of features of the first policy, implementing a responsive action by the network device according to a schema that defines instructions for each feature represented by the plurality of positions in the device fingerprint.

16. The non-transitory computer readable medium of claim 15, wherein the schema includes instructions for responsive actions to be taken by the network device when not in compliance with each feature represented by the plurality of positions in the device fingerprint.

17. The non-transitory computer readable medium of claim 15, wherein the first policy and the set of desired values are included with a first mask received by the network device.

18. The non-transitory computer readable medium of claim 17, wherein the first mask indicates to the network device which positions in the device fingerprint correspond to the first combination of the plurality of features of the first policy.

19. The non-transitory computer readable medium of claim 15, wherein the instructions further cause the processor to perform:

obtaining a second policy that includes a second combination of the plurality of features and a set of desired values for the second combination of the plurality of features, wherein the second combination of the plurality of features is different than the first combination of the plurality of features of the first policy.

20. The method of claim 1, wherein comparing the first policy to the device fingerprint for the network device includes:

identifying, at the network device, the plurality of features of the first policy in the device fingerprint using a mask that indicates to the network device which positions in the device fingerprint correspond to the plurality of features of the first policy; and comparing, at the network device, first values of the plurality of features identified in the device fingerprint with second values for the plurality of features specified in the first policy.

* * * * *